Nov. 29, 1927.
C. W. ANDERSON
1,651,174
STEERING RANGE FOR AUTOMOBILES
Filed March 7, 1927
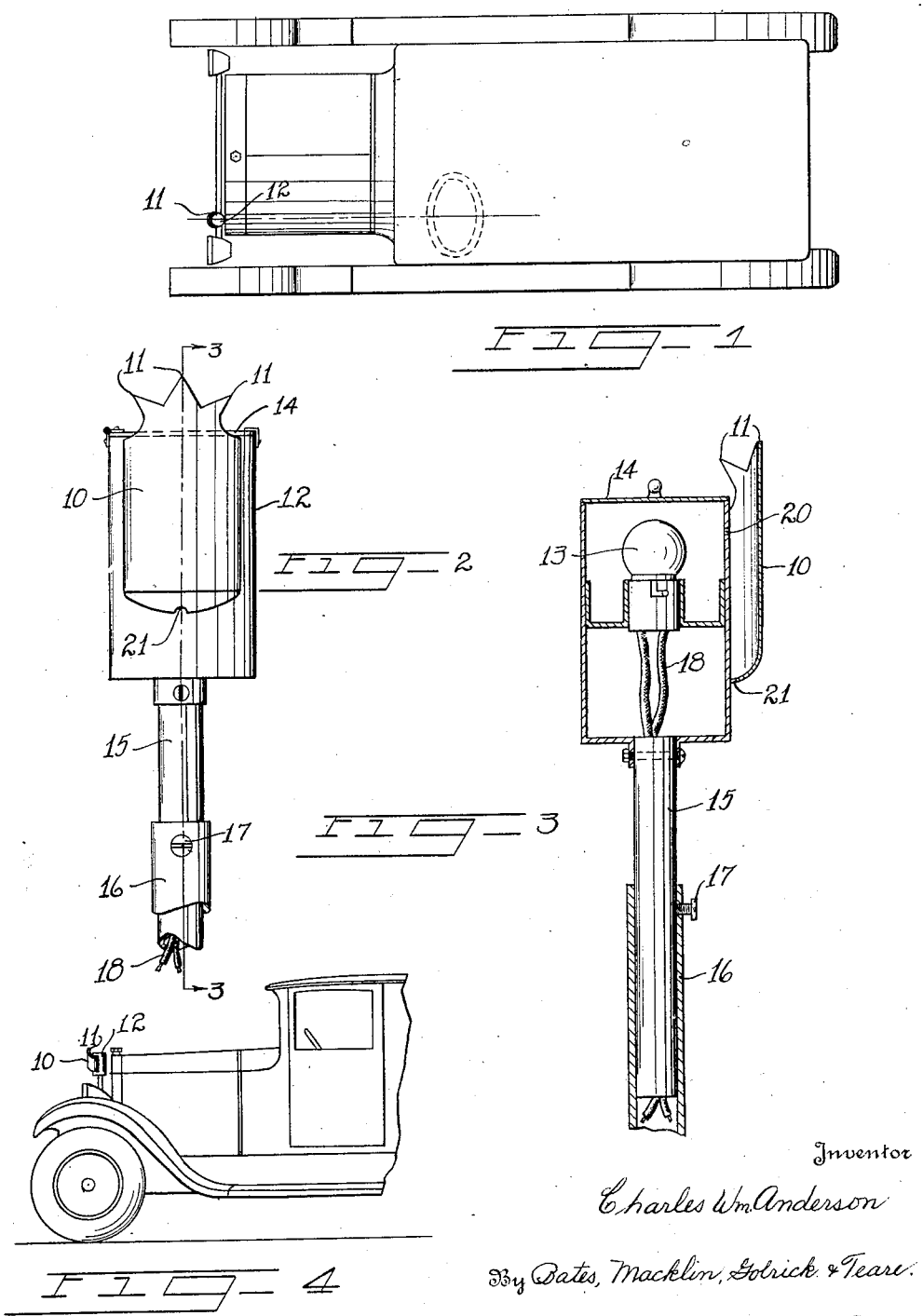
Inventor
Charles Wm Anderson
By Bates, Macklin, Golrick & Teare.
Attorneys Patented Nov. 29, 1927.

1,651,174

UNITED STATES PATENT OFFICE.

CHARLES W. ANDERSON, OF MILAN, OHIO.

STEERING RANGE FOR AUTOMOBILES.

Application filed March 7, 1927. Serial No. 173,537.

This invention relates to means for enabling the driver of a motor vehicle to operate it in a pre-determined direction with a minimum degree of effort and manipulation of the steering wheel. The invention is particularly applicable for enabling the driver to detect swerving of the car, especially at night, and for determining clearance limits of an approaching vehicle, whereby passage may be effected without necessitating an appreciable diminution of speed, and with a greater degree of safety. In this connection my invention is directed toward means which may be readily mounted on a motor vehicle, and may be adapted for facilitating range determination at night as well as at day. The invention also contemplates an adjustable device which may be arranged to suit the driver's convenience.

In practice the device embodying my invention is mounted on the forward part of the vehicle and preferably in the direct line of straight-ahead vision. In this way the driver may readily detect any lateral movement of the car from a pre-determined direction of travel, and thus may more easily maintain the vehicle in the desired path of travel.

In the drawings, Fig. 1 is a plan view of the motor vehicle having my invention attached thereto; Fig. 2 is a front elevation of the device; Fig. 3 is a vertical section taken through the device on a plane indicated by the line 3—3 in Fig. 2; and Fig. 4 is a side elevation of part of a motor vehicle having my invention attached thereto.

The preferred construction of a steering range device embodying my invention comprises a member 10 having a plurality of spaced points 11 disposed thereon adjacent the upper end thereof. This member as shown comprises a curved plate which is fastened in any suitable manner to the exterior surface of a casing, or housing 12. The housing illustrated is a tubular member in which provision is made for supporting an electric lamp 13. The housing may be provided with a removable cover 14, the top of which is below the spaced points 11.

The housing is supported in any convenient manner adjacent the front portion of the vehicle and at the desired point which the driver wishes to use as a marker for enabling him to control with accuracy the position of the vehicle. One form of such support embodies telescoping tubes 15 and 16, the first of which is attached to the housing and is arranged to slidably engage the second and to be positioned thereon by means of a set screw 17. The member 16 may be fastened in any convenient way to the vehicle. The leads 18 for the lamp may be passed through the tubing.

For enabling the driver to maintain a vehicle in a straight line path, I prefer to mount the device, which I term a "steering range," directly in the normal line of straight-ahead vision. For use on busses or trucks, one or more of such steering ranges may be employed at different parts of the forward portion of the vehicle. For example, one may be positioned in the line of straight-ahead vision, while another may be mounted near the right-hand side of the vehicle and may be adjusted so as to bring one of the pointers in a line with the curb. By so adjusting the steering range that the curb is disposed in the line of vision with one of the pointers, while the wheels are a pre-determined distance from the curb line, then the driver may be assured of operating the vehicle at a fair rate of speed with safety. This is advantageous on busses, particularly since the distance between the rear wheels is greater than the distance between the front wheels.

For straight-ahead driving, the steering range is usually so mounted that in lowest position the pointers are about on a level with the radiator cap. The adjustment permits movement above this position to suit the convenience of the driver. For night driving an aperture 20 in the casing permits a sufficient amount of light to show in the region of the pointers to insure a good vision thereof, without throwing a glare in the eyes of the driver.

As shown, the bottom of the plate 10 is closed so as to confine the rays of light upon the pointers, while a small opening 21 permits the drainage of any rainwater which may be collected between the plate and casing.

A steering range made in accordance with my invention can be made ornamental, and when mounted on a motor vehicle, can be readily adjusted to suit the requirements of any particular driver. By means of the range the driver may readily detect slight swerving of the vehicle, and thus may maintain a straight line direction of travel within narrow limits with comparative degree of safety. This is especially noticeable at night when an approaching car has extremely bright lights, and the highway is narrow. In such cases the driver may readily set the direction of car movement while an approaching vehicle is sufficiently far away to enable clearance space to be determined, and then may easily maintain such set position.

I claim:

1. In combination, a motor vehicle, a steering range member mounted on the forward portion of the vehicle, said member being disposed on one side of the center line of the vehicle and having the upper end terminating in a plurality of points, and means for adjusting the member vertically with reference to the vehicle.

2. In combination, a motor vehicle having a hood and a head-lamp, and a steering range member projecting upwardly from the forward portion of the vehicle and between the head-lamp and hood, said member terminating in a point at the upper end thereof.

3. In combination, a motor vehicle having a hood, a member mounted on the forward end of the vehicle, and projecting upwardly therefrom, said member being mounted normally in a line of straight-ahead vision of the driver, and approximately on a level with the top of said hood.

4. A steering range device comprising a member having one end thereof terminating in a point, a hollow casing associated with said member, means within the casing for illuminating the member, and means for supporting the casing on a motor vehicle.

5. A steering range device comprising a member having one end thereof terminating in a plurality of equidistantly spaced points, a hollow casing associated with said member, means within the casing for illuminating the points and means for adjustably supporting the casing on a motor vehicle.

6. A device of the character described comprising in combination, a steering range member embodying a curved plate having one end thereof terminating in a point, a hollow casing supporting said member and having an aperture therein, and illuminating means within the casing, said means being adapted to emit rays of light through said opening and onto the concave side of said plate.

7. A device of the character described comprising in combination, a hollow casing, a curved plate carried by the casing and having a portion thereof projecting above the top of the casing, illuminating means within the casing, there being an opening in the casing through which rays of light may be directed onto that portion of the plate which projects above the casing, a support, and means for adjusting the casing vertically upon the support.

In testimony whereof, I hereunto affix my signature.

CHARLES WM. ANDERSON.